United States Patent Office 3,244,592
Patented Apr. 5, 1966

3,244,592
ASCOMYCIN AND PROCESS FOR ITS
PRODUCTION
Tadashi Arai, 1–71 Nogata-machi, Nakano-ku,
Tokyo-to, Japan
No Drawing. Filed May 1, 1963, Ser. No. 277,111
Claims priority, application Japan, June 9, 1962,
37/23,253
4 Claims. (Cl. 167—65)

This invention relates to a new and useful substance called ascomycin, and to its production. More particularly it relates to processes for its production by fermentation and methods for its recovery and purification. The invention embraces this compound in dilute solutions, as crude concentrates and as purified solids. Ascomycin is an effective inhibitor of filamentous fungi, e.g. *Penicillium chrysogenum*, at very low concentrations, e.g. about one part per million in a nutrient agar, and does not inhibit various Gram-positive and Gram-negative bacteria even at much higher concentrations.

There is now provided, according to the present invention, a new antifungal substance identified as ascomycin which is produced by a process which comprises cultivating a strain of *Streptomyces hygroscopicus* var. *ascomyceticus*, and preferably A.T.C.C. 14891 or an isolate, mutant, descendant or variant thereof, in an aqueous carbohydrate solution containing an organic nitrogenous nutrient under submerged aerobic conditions, e.g. at about 26° C., for at least twelve hours until substantial activity against filamentous fungi, e.g. *Aspergillus niger*, is imparted to said solution and then, if desired, recovering said ascomycin.

There is further provided, according to the present invention, a process of producing an antifungal agent, identified as ascomycin, which comprises cultivating *Streptomyces hygroscopicus* var. *ascomyceticus* under submerged aerobic conditions in an aqueous carbohydrate solution containing a nitrogenous nutrient for at least twelve hours and then, if desired, recovering the so-produced ascomycin from the fermentation broth.

The organism producing the ascomycin of the present invention was isolated from a sample of soil obtained in Sannomiya City, Japan, and is a new variety, designated *ascomyceticus*, of the species *Streptomyces hygroscopicus*. A culture of the living organism, given the laboratory designation KK 317, has been deposited in the American Type Culture Collection, Washington, D. C., and added to its permanent collection of micro-organisms as A.T.C.C. 14891.

With the color tones as defined by Maerz and Paul's Dictionary of Color, McGraw-Hill (1950 edition), the representative strain of *S. hygroscopicus* var. *ascomyceticus* has the following characteristics:

*Morphology*.—Aerial mycelia form 3–5 tight spirals on synthetic medium and on glucose-asparagine agar. Spores are ellipsoidal or small cylindrical, 1.6–2.0 x 1.0–1.2µ in size, and have smooth surface under electron-microscope.

The growth on the identification media for streptomyces species is as follows:

*Glucose-Czapek medium*.—Growth, pale-lemon color to brownish, with rugged surface (13L6). Aerial mycelium, at first white, later mouse-gray (7C7). Surface of the colony turns to black when touched with loop. Very small amount of greenish-brown soluble pigment is produced.

*Glucose - asparagine agar*.—Colony, pale yellowish-green, round. Aerial mycelium, abundant, gray. Soluble pigment, yellowish, scarce.

*Nutrient agar*.—Growth, pale greenish-brown, flat. The surface is covered with grayish aerial mycelia, like velvet. No soluble pigment.

*Starch agar*.—Elevated growth. Vegetative mycelium, cream colored. Aerial mycelium, mouse-gray, powdery. The surface of the growth, mosaic of gray and black. No soluble pigment.

*Yeast extract nutrient agar*.—Growth, yellowish-brown, wrinkled, with cracks on its surface. Aerial mycelium, poor, white, grows on the surroundings of colony. No soluble pigment.

*Potato plug*.—Growth, flat, spread. Aerial mycelium, white, cottony. The color of the plug is not changed.

*Carrot plug*.—Growth, cream-colored, spotted, with subsided center. Aerial mycelium, abundant, white, cottony. No color change of the plug.

*Litmus milk*.—Thin surface growth, pale-cream colored. Aerial mycelium, white. No soluble pigment. Coagulated from seventh day, digested gradually.

*Gelatin*.—No pigment formation. strong lysis.

*Blood agar*.—Colony, grayish-brown, round shaped, with subsided center. No aerial mycelium. No soluble pigment. Strong hemolysis.

*Cellulose medium*.—Grows in synthetic culture solution containing cellulose as a sole carbon source.

*Starch hydrolysis*.—Strong.

*Nitrate reduction*.—Negative.

Sugar utilization using Pridham's synthetic media containing various sugars is as follows:

Glucose ++, Starch ++, Xylose +, Dextrin ++, Arabinose +, Mannitol ++, Rhamnose ++, Sorbitol ±, Fructose ++, Dulcitol —, Galactose ++, Inositol —, Saccharose ++, Adonitol +, Maltose ++, Salicin —, Lactose +, Sodium acetate +, Raffinose +, Sodium citrate —, Inulin —, Sodium succinate +.

In several media, aerial mycelia have a tendency to be wetted.

The above-described morphological characters and findings on the identification media are compared with those described in Bergey's Manual (Williams and Wilkins, 7th edition, 1957), Pridham's Classification Standard (Applied Microbiology, volume 6, pages 52–79, 1958) and Waksman's book (Actinomycetes, 2 volumes, 1961), and the classification of this strain is investigated as follows:

It is characteristic of this strain that its aerial mycelia form spirals and it produces no specific soluble pigment on any culture media including synthetic ones.

When only the colors of aerial mycelia and vegetative mycelia on synthetic media are taken as important points, the resembling species, which have gray or black aerial mycelia and yellow or greenish yellow-brown vegetative mycelia, are found in the above-described classification books. *Streptomyces fungicidicus*, *Streptomyces albus*, *Streptomyces niveus*, *Streptomyces platensis*, *Streptomyces humidus*, *Streptomyces cacaoi*, *Streptomyces pseudogriseus*, *Streptomyces halstedii*, *Streptomyces rutgersensis* and *Streptomyces hygroscopicus* have resembling points. Among these species, *Streptomyces albus* forms white aerial mycelium on glucose asparagine agar, *S. macrosporeus* does not form aerial mycelium on the same medium, and *Streptomyces niveus* forms cream-pink aerial mycelia. Thus they are clearly different from the strain of the present invention.

*Streptomyces fungicidicus* is different in that it produces yellow soluble pigment in certain media, and produces dark brown pigment in potato plug. *Streptomyces pseudogriseus* forms grayish brown aerial mycelia on synthetic media and differs from the present strain in its color. *Streptomyces halstedii* and *Streptomyces rutgersensis* show different growth on potato plug but their dark black color is characteristic. In this point they are differentiated from the strain of the present invention.

Thus, this strain has much resemblance to *Streptomyces platensis*, *Streptomyces humidus*, *Streptomyces cacaoi* and *Streptomyces hygroscopicus*. Among them, *Streptomyces platensis* and *Streptomyces humidus* belong to the *Streptomyces hygroscopicus* group, according to the idea of the species-group in the modern classification of Streptomyces. This is discussed in the paper of Tresner and Baccus (Applied Microbiology, vol. 4, pages 243–250, 1956) and also described in Waksman's book.

Thus, this strain is considered most properly to belong to *Streptomyces hygroscopicus* when a hygroscopic tendency of aerial mycelium is also taken in consideration. The comparison of various characteristics of this strain and the standard strain of *Streptomyces hygroscopicus* also showed good resemblance.

A fermentation broth containing ascomycin is prepared by inoculating spores or mycelia of the ascomycin-producing organism into a suitable medium and then cultivating under aerobic conditions. For the production of ascomycin, cultivation on a solid medium is possible, but for production in large quantity cultivation in a liquid medium is preferable. The temperature of the cultivation may be varied over a wide range, 20–35° C., within which the organism may grow but a temperature of about 27° C. and a neutral pH, i.e. pH 6.0–8.0, are preferred. In the submerged aerobic fermentation of the organism for the production of ascomycin, the medium contains as the source of carbon a commercially available glyceride oil or a carbohydrate such as glycerol, glucose, maltose, sucrose, lactose, dextrin, starch, etc. in pure or crude states and as the source of nitrogen an organic material such as soybean meal, distillers' solubles, peanut meal, cottonseed meal, meat extract, peptone, fish meal, yeast extract, corn steep liquor, etc., and, when desired, inorganic sources of nitrogen such as nitrates and ammonium salts, and mineral salts such as sodium chloride, potassium chloride and magnesium sulfate, and buffering agents such as calcium carbonate or phosphates and trace amounts of heavy metal salts; such medium ingredients include those listed in Canadian Patent 513,324 and in British Patents 730,341 and 736,325 and in U.S. Patents 2,691,618, 2,658,018, 2,653,899, 2,586,762, 2,516,080, 2,483,892, 2,609,329, and 2,709,672. In aerated submerged culture an antifoam such as liquid paraffin, fatty oils or silicone is used. More than one kind of carbon source, nitrogen source or antifoam may be used for the production of ascomycin. Generally, the cultivation is continued for about 12–72 hours, e.g. until at least several hundred mcg./ml. of ascomycin is accumulated in the medium.

The active substance is contained mainly in mycelia, but ascomycin exists also in fermentation liquor. The potency of ascomycin is represented by units such that 1 unit/ml. equals the minimum concentration to inhibit the spore-formation of *Aspergillus niger*.

The mycelia is separated from fermentation liquor, washed with water and then extracted by water-soluble solvents such as acetone, methanol, ethanol, and other low alcohols or by water-immiscible solvents such as ether, chloroform and others. The solvent-extract is concentrated and the active substance is extracted by water-insoluble solvents from the water-containing concentrate. The extract is dried, chromatographed using active carbon, cellite, alumina, silica gel and others and developed with ether, chloroform and others. By repeating fractional precipitation by solvents, after active fractions are combined and concentrated, purified ascomycin is obtained as a colorless syrup. Ascomycin is obtained as white solid by drying this syrup.

Purified ascomycin is easily soluble in carbon tetrachloride, benzene, chloroform, ether, acetone, esters and lower alcohols, but hardly soluble or insoluble in water, petroleum ether and n-hexane.

Ascomycin decolorizes potassium permangenate solution. Iron-hydroxamate reaction is positive-like. Ninhydrin, biuret, Molisch, Fehling, iron-perchlorate, 2,4-dinitrophenol and hydrazine reactions are all negative. It is stable when it is heated at 100° C. for one hour. The ultraviolet absorption in ethanol, indicates only end-absorption.

Ascomycin forms a single antibacterial spot of Rf 1.0 when it is paper-chromatographed using solvent systems such as water-saturated butanol; 80% phenol; butanol-methanol-water (2:1:1); benzene-methanol (3:1); butanol-ethanol-water (2:1:1); 50% acetone, pyridine-butanol-water (4:6:3).

The in vitro antibiotic activity of ascomycin is as follows:

| Test organism | Conc. for complete inhibition (mcg./ml.) | Conc. for incomplete inhibition (mcg./ml.) | Culture, hours |
| --- | --- | --- | --- |
| *Staphylococcus aureus* (209P) | >100 | | 24 |
| *Bacillus subtilis* (PCI219) | >100 | | 24 |
| *Escherichia coli* (F1) | >100 | | 24 |
| *Pseudomonas aeruginosa* | >100 | | 24 |
| *Salmonella enteritidis* on nutrient agar at 27° C | >100 | | 24 |
| *Candida krusei* | >100 | | 24 |
| *Candida parakrusei* | >100 | | 24 |
| *Candida albicans* | >100 | | 24 |
| *Cryptococcus neoformans* | >100 | | 24 |
| *Trichophyton interdigitale* | | 1 | 96 |
| *Trichophyton mentagrophytes* | | 1 | 72 |
| *Trichophyton rubrum* | 75 | 50 | 144 |
| *Trichophyton tonsulans* 830 on Sabouraud agar at 37° C | | 50 | 240 |
| *Zygosaccharomyces salsus* Nagao | 100 | | 48 |
| *Saccharomyces sake* | >100 | | 48 |
| *Willia anomala* | >100 | | 48 |
| *Mycoderma* | >100 | | 48 |
| *Mucor mucedo* | | 7.5 | 72 |
| *Rhizopus nigricans* | 1 | 0.5 | 72 |
| *Aspergillus niger* ATCC 6275 | | 0.75 | 72 |
| *Aspergillus oryzae* | 1 | 0.5 | 72 |
| *Penicillium glaucum* | | 25 | 48 |
| *Penicillium chrysogenum* Q176 | 1 | | 48 |
| *Neurospora crassa* ATCC 9277 | | 10 | 72 |
| *Mycobacterium tuberculosis* 607 on 1% sugar-nutrient agar at 27° C | 50 | | 72 |

This antibiotic substance is, as indicated in the above-described antibiotic spectrum, effective against fungi, especially against filamentous fungi but ineffective against common bacteria. It is exceptionally active against acid-fast bacteria, and incompletely inhibits Trichophyton at lower concentrations.

The acute toxicity of ascomycin was tested by intraperitoneal injection in mice. All the mice survived 100 mg./kg. injection.

The above-described characteristics are compared with those of known antibiotics abtained from Streptomyces, especially with those of colorless antibiotics. Ascomycin was clearly differentiated from various polyene antifungal antibiotics by its ultraviolet absorption.

Ascomycin differs from endomycin and helixin in that the former is completely inactive against bacteria and the latter is active against both fungi and bacteria. Ascomycin also differs from acti-dione (cycloheximide) and its related substances, streptobiocin or naramycin, because ascomycin is ineffective against yeasts such as Saccharomyces.

Similarly, ascomycin is clearly ineffective on Candida and thus differs from amidomycin, querulomycin, datemycin, eumycetin, flavofungin and toyokamycin.

In addition, ascomycin has only end-absorption in its ultraviolet spectrum and if its solubility in various solvents color reactions and other characteristics are also considered this substance is easily determined to be a new antibiotic substance.

The following examples are for purposes of illustration only and not of limitation and illustrate the recovery of ascomycin from fermentation broth in both crude and purified form.

Example 1

Glucose 5 g., starch 5 g., beef extract 5 g., polypeptone 10 g., sodium chloride 5 g., tap water 1000 ml., pH 7.0. Culture medium which has the above-described composition is autoclaved at 120° C. for 20 minutes. To this medium, *Streptomyces hygroscopicus* No. KK 317 is inoculated and aerobically fermented in submerged culture at 25–27° C. The growth of mycelium reaches the maximum after three days fermentation. Then the mycelium is collected, washed with water and extracted with acetone (five volumes) to obtain an extract containing 320 units per ml. This extract is concentrated under atmospheric pressure to $1/_{15}$ volume, and the turbid yellowish-brown concentrate is extracted with two volumes of ether, divided into two parts. The ether-extract is washed with small quantities of water, dried and concentrated under atmospheric pressure to evaporate off the acetone and ether completely. The residue obtained is dissolved in ether, and passed through a 2 x 30 cm. glass filled with a mixture of active carbon and diatomaceous earth (1:1), developed with ether, and highly potent fractions are collected to obtain ascomycin as a pale yellow syrup. This is passed through a similar glass tube filled with silica gel and developed with ether. Next, highly-potent fractions are combined and concentrated to obtain ascomycin as a colorless syrup. Further, this syrup is dissolved in ether and n-hexane is added to obtain a white flocullant precipitate. By drying this precipitate about 200 mg. of purified ascomycin is obtained as a powder.

Example 2

Soybean flour 20 g., "ebios" 0.5 g., starch 2.5 g., magnesium chloride 0.007 g., copper sulfate 0.007 g., zinc sulfate 0.03 g., calcium carbonate 3.5 g., tap water 1000 ml., pH 7.0. Ten ml. of a liquid medium with the above-described composition is autoclaved at 120° C. for 20 minutes, inoculated with *Streptomyces hygroscopicus* var. *ascomyceticus* and shake-cultured aerobically at 27° C. The growth reaches the maximum after three days and the mycelial extract by five volumes of acetone has a potency of 160 units per ml. By the similar treatment as in Example 1, about 100 mg. of ascomycin is obtained.

I claim:
1. The process of producing an antifungal agent, identified as ascomycin, which comprises cultivating a strain of *Streptomyces hygroscopicus* var. *ascomyceticus* under submerged aerobic conditions in an aqueous carbohydrate solution containing a nitrogenous nutrient for at least twelve hours.
2. The process of producing an antifungal agent, identified as ascomycin, which comprises cultivating a strain of *Streptomyces hygroscopicus* var. *ascomyceticus* under submerged aerobic conditions in an aqueous carbohydrate solution containing a nitrogenous nutrient for at least twelve hours and then recovering from the broth the ascomycin thus produced.
3. The process of claim 1 in which the microorganism is A.T.C.C. 14891.
4. A new antifungal agent identified as ascomycin which is prepared by the process which comprises cultivating a strain of *Streptomyces hygroscopicus* var. *ascomyceticus* under submerged aerobic conditions in an aqueous carbohydrate solution containing a nitrogenous nutrient for at least twelve hours and then recovering from the broth the ascomycin thus produced.

References Cited by the Examiner

UNITED STATES PATENTS

| | | | |
|---|---|---|---|
| 3,032,470 | 5/1962 | Ziffer et al. | 195—80 X |
| 3,094,460 | 6/1963 | Boer et al. | 195—80 X |

OTHER REFERENCES

Ascomycin, An Antifungal Antibiotic, T. Arai et al., J. Antibiotics (Japan), Series A, 15, 231–232 (1962).

Nakazawa et al.: J. Agr. Chem. Soc. (Japan) 28 (4), 296–299, April 1954.

Nakazawa et al.: J. Agr. Chem. Soc. (Japan) 28 (9), 715–716, September 1950.

Tresner and Baccus: Applied Microbiology, 4, 243–250 (1956).

Wakaki et al.: J. Antibiotics, Ser. B 5(1), 24–29, January 1952.

A. LOUIS MONACELL, *Primary Examiner.*

DAREN M. STEPHENS, *Assistant Examiner.*